United States Patent [19]
Barron et al.

[11] 3,821,130
[45] June 28, 1974

[54] AIR FROTHED POLYURETHANE FOAMS

[75] Inventors: Benny Gene Barron; James Ray Dunlap, both of Lake Jackson, Tex.

[73] Assignee: The Dow Chemical Company, Midland, Mich.

[22] Filed: May 18, 1973

[21] Appl. No.: 361,689

Related U.S. Application Data

[63] Continuation-in-part of Ser. No. 247,856, April 26, 1972, abandoned.

[52] U.S. Cl............ 260/2.5 BD, 260/2.5 AP, 260/2.5 AM, 260/2.5 AF, 260/2.5 AG
[51] Int. Cl............................................. C08q 22.44
[58] Field of Search... 260/2.5 AP, 2.5 AM, 2.5 AF, 260/2.5 BD, 2.5 AG

[56] References Cited
UNITED STATES PATENTS
3,336,242   8/1967   Hamson et al................. 260/2.5 AP OTHER PUBLICATIONS
Knox, Chem. Engr. Prog., 57, No. 10, Oct, 1961.

Primary Examiner—M. J. Welsh
Attorney, Agent, or Firm—James G. Carter

[57] ABSTRACT

Flexible polyurethane foams are prepared from inert gas frothed mixtures of (1) a polyether polyol end-capped with at least 2 moles of ethylene oxide per OH group, (2) an isocyanate containing prepolymer and (3) a catalyst for urethane formation.

7 Claims, No Drawings

AIR FROTHED POLYURETHANE FOAMS

The present application is a continuation-in-part of our previous application Ser. No. 247,856, filed Apr. 26, 1972 now abandoned.

This invention relates to polyurethane foams and more particularly relates to air blown flexible polyurethane foams and a process for preparing them.

Polyurethane foams are well known, as are methods for their preparation. In general, the reactants, a polyhydroxyl containing compound such as a polyether polyol or polyester polyol and a polyisocyanate are reacted together in the presence of a suitable catalyst, cell control agent or surfactant and a foaming or blowing agent such as a low boiling hydrocarbon or halohydrocarbon or water which reacts with the isocyanate producing $CO_2$ which provides the gas for blowing.

It has now been unexpectedly discovered that flexible polyurethane foams having densities below about 15 lbs/ft$^3$ and possessing good physical properties can be prepared without the use of a volatile or reaction type (water, decomposable carbonates and the like) blowing agent and a silicone oil surfactant or cell control agent. The discovery being that the foams are prepared by frothing, by means of an inert gas, a mixture comprising a polyether polyol which has been end-capped with at least 2 moles of ethylene oxide per active hydrogen atom or which contains an internal block of at least about 3 moles of ethylene oxide per active hydrogen atom or combination thereof and a suitable polyisocyanate.

The flexible polyurethane foams of the present invention comprise an inert gas frothed mixture comprising (1) an active hydrogen-containing composition comprising (a) from about 50 to 100 parts by weight and preferably from about 80 to 95 parts by weight of a polyether polyol having a hydroxyl functionality of from 2 to 3 and containing an end-cap of at least 2 moles of ethylene oxide per active hydrogen atom or an internal block of at least 3 moles of ethylene oxide per active hydrogen atom or combination thereof and having an OH equivalent weight of from about 1,000 to about 2,500 and (b) from 0 to about 50 parts by weight and preferably from about 5 to about 20 parts by weight of an aromatic amine, a glycol or mixture thereof, (2) a polyisocyanate-containing material selected from the group consisting of (a) an isocyanate terminated prepolymer resulting from the reaction of an organic diisocyanate with a compound having from 2 to 4 hydroxyl groups per molecule and an OH equivalent weight of from about 53 to about 1,000, (b) polymeric polyisocyanates, (c) crude aromatic diisocyanates and (d) mixtures thereof, and (3) a catalyst for urethane formation, wherein (1) and (2) are employed in quantities so as to provide an NCO:OH ratio of from about 0.85:1 to about 2.0:1 and preferably from about 1.0:1 to about 1.2:1.

The polyurethane foams of the present invention are prepared by mechanically inducing air or other gaseous substance into a mixture comprising (1) the polyol component, (2) the isocyanate-containing prepolymer and (3) the catalyst for urethane formation.

Suitable gaseous substances which are employed in the present invention include any gaseous element, compound, or mixture thereof which exist in the gaseous state under standard conditions of temperature and pressure, i.e., 25°C and 1 atmosphere, including for example, xenon, helium, carbon dioxide, nitrogen, oxygen, propane, methane, ethane or mixtures thereof such as, for example, air and the like, provided such does not react with any of the urethane forming components.

The foams of the present invention, unlike the polyurethane foams prepared in the conventional manner do not require the use of a volatilizing blowing or foaming agent or a silicone oil cell control agent. In the present invention, the foams are prepared by mechanically inducing the inert gas into the urethane-forming composition thereby producing a froth which is or can be dispensed into a suitable mold or onto a suitable substrate whereupon the frothed mixture sets into a cellular polyurethane product. The conventional froth resulting from the mechanical inducing of inert gas into the urethane-forming mixture does not undergo any subsequent significant expansion other than that caused by any thermal expansion of the inert gas employed which is very small, i.e., less than about 1 percent by volume.

The froth is obtained by mechanically inducing the inert gas into the foam composition. This is readily accomplished by a mixer such as a hand kitchen mixer fitted with a blade designed to mechanically whip or blend air or other inert gas into the mixture of urethane-forming components such as the type of blade employed in preparing whipped cream or for preparing meringue from egg whites or the like. Another method, which is more readily adaptable to large scale production is by feeding a stream composed of a mixture of the urethane-forming components or separate streams of the urethane-forming components and a stream of air or other inert gas into a suitable froth generator-mixer such as, for example, an Oakes foamer whereupon the frothed composition which emerges from the froth generator-mixer is directed into a suitable mold or onto a suitable substrate wherein or whereupon the frothed composition thermosets into a flexible polyurethane foam.

Still another method is to feed the inert gas and all of the urethane-forming components except for the catalyst into the froth generator-mixer and subsequently mixing the catalyst with the resultant froth in a suitable mixer such as a static mixer and then directing the resultant catalyst-containing froth into a suitable mold or onto a suitable substrate.

Polyols which are suitably employed as component (1) in the flexible foam compositions of the present invention include those represented by the following general formula

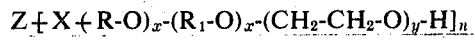

wherein Z is the residue of a divalent or trivalent initiator compound having 2 or 3 active hydrogen atoms, X is nitrogen or oxygen, each R is independently a divalent hydrocarbon group selected from

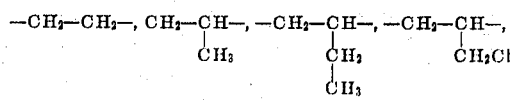

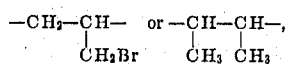

each $R_1$ is independently selected from the same group as R except the group -$CH_2$-$CH_2$-, each $x$ and $x_1$ are positive integers, $y$ has a value of at least 2 and preferably from 2 to about 6, $n$ has a value of 2 or 3 and the sum of $x$, $x_1$ and $y$ are such as to provide the polyol with an OH equivalent weight of from about 1,000 to about 2,500, preferably from about 1,000 to about 2,000.

These or other suitable polyols can be prepared by the catalytic condensation of an alkylene oxide such as ethylene oxide, propylene oxide, butylene oxide, epichlorohydrin, epibromohydrin or mixtures thereof with a compound having from 2 to 3 active hydrogen atoms such as, for example, ammonia, methyl amine, ethyl amine, ethanol amine, aminoethyl ethanolamine, N-methyl ethylene diamine, N-ethyl ethylenediamine, N,N-dimethylethylenediamine, N,N'-dimethylethylenediamine, ethylene glycol, propylene glycol, 1,2-butanediol, 1,4-butanediol, 1,5-pentane diol, 1,6-hexanediol, glycerine, trimethylol propane, mixtures thereof and the like, and, if the polyol does not contain an internal block of at least 3 moles of ethylene oxide per hydroxyl group or active hydrogen group contained in the initiator compound, subsequently reacting the resultant product with at least 2 (preferably from about 2 to about 6) moles of ethylene oxide per hydroxyl group.

Suitable glycols, i.e., compounds having 2 hydroxyl groups and an OH equivalent weight of from about 50 to about 500, preferably from about 50 to about 250, which are employed as component (1-b) of the present invention include, for example, diethylene glycol, dipropylene glycol, triethylene glycol, butylene glycol, dibutylene glycol, polyoxyalkylene glycols having 2 to 4 carbon atoms in the alkylene groups, mixtures thereof and the like.

Suitable aromatic amines which are employed in component (1-b) of the present invention include, for example, 4,4'-methylene-bis-(2-chloroaniline), p-phenylene diamine, methylene-bis(2-methoxyaniline), tolidine, dianisidine, 3,3'-dichlorobenzidine, mixtures thereof and the like.

The prepolymers employed as component (2) in the present invention are the isocyanate terminated reaction products of an organic diisocyanate and a polyether polyol having an average hydroxyl functionality of from 2 to about 4.5 and an OH equivalent weight of from about 53 to about 1,000, preferably from about 53 to about 100.

Suitable organic diisocyanates which are employed in the preparation of the prepolymers include toluene diisocyanate, hexamethylene diisocyanate, p,p'-diphenylmethane-diisocyanate, p-phenylenediisocyanate, naphthalenediisocyanate, dianisidine diisocyanate, mixtures thereof and the like.

Suitable polyether polyols which are reacted with the organic diisocyanates to prepare the isocyanate terminated prepolymers employed in this invention include for example the polyether polyols having hydroxyl equivalent weights of from about 53 to about 1,000 prepared by condensing a vicinal alkylene oxide such as, for example, ethylene oxide, propylene oxide, butylene oxide, mixtures thereof and the like with a compound containing 2-4 hydroxyl groups such as, glycerine, trimethylol propane, penaerythritol, ethylene glycol, propylene glycol, 1,4-butanediol, 1,5-pentanediol, 1,6-hexanediol, mixtures thereof and the like, and including mixtures of such compounds with compounds having from about 5 to about 8 hydroxyl groups per molecule with the proviso that the average OH functionality of such mixture does not exceed about 4.5.

The term crude aromatic diisocyanate as employed herein means those diisocyanates which contain polymeric derivatives thereof. Such isocyanates are usually prepared commercially by blending the pure or distilled isocyanates with the bottoms or polymers thereof resulting during purification to produce the so-called pure or distilled isocyanates. Such crude isocyanates include, for example, those available commercially as follows:

HYLENE TRC available from E. I. duPont de Nemours & Co., Inc.,
NACCONATE 5050 available from Allied Chemical Co., and
NIAX TDR available from Union Carbide Corp.

Suitable polymeric isocyanates include, for example, the polymethylene polyphenyl isocyanates which are available commercially as follows:

MONDUR MR available from Mobay Chemical Co.,
PAPI available from Upjohn Co.,
ISONATE 135 available from Upjohn Co., and
NCO 20 available from Kaiser.

Suitable mixtures of organic diisocyanates and polymeric isocyanates include, for example, Modur MT—40 which is a 50—50 mixture of 80/20, 2,4-2,6-toluene diisocyanate and polymethylene polyphenyl isocyanate commercially available from Mobay Chemical Co.

Suitable catalysts for promoting urethane formation which may be employed in the foam formulation include, for example, tertiary amines of which tetramethylbutanediamine, triethylenediamine and N-ethylmorpholine are examples. Other catalysts which may be employed in the preparation of the polyurethane foams of the present invention include, for example, lead naphthenate, zinc naphthenate, aluminum distearate, aluminum tristearate, plumbous stearate, plumbous stearate (basic), stannous octoate, stannous oleate, dibutyl tin dilaurate, aluminum mono-stearate, zinc stearate, cadmium stearate, silver acetate, lead pelargonate, phenylmercuric acetate, mixtures thereof, and the like. These catalysts are disclosed and described more fully in U.S. Pat. No. 3,391,091.

In addition to the active hydrogen-containing component (1), isocyanate-containing prepolymer (2) and catalyst, component (3), the polyurethane foam formulation of the present invention may contain fillers, fire retardant agents and the like.

Suitable fillers include, for example, barium sulfate, calcium carbonate, aluminum trihydrate, expandable polystyrene beads, mixtures thereof, and the like.

When it is desired to prepare polyurethane foams having fire retardant properties, fire retardant compounds may be added to the foam formulation. Suitable such fire retardant compounds include phosphorus-containing compounds including, for example, tricresyl phosphate and the like, halogenated phosphates including, for example, tris(dichloropropyl) phosphate, 3-bromopropane phosphonate and the like, halogenated glycols including, for example, dibromoneopentyl-glycol and the like, inorganic salts including, for example, magnesium ammonium phosphate, ammonium bromide, calcium phosphate and the like, and mixtures of any of the above compounds.

When the inorganic filler compounds and in some instances the other additives are employed in the composition of the present invention, the overall density will in many cases exceed a value of about 15 lbs/ft³; however when the density is calculated on a basis which excludes the weight attributed to the inorganic filler or other additive, then the density will not exceed a value of about 15 lbs/ft³. Therefore, such an increase in density caused by the added weight of the fillers or other additive does not remove such a foam product from the purview of the present invention in that it is the density calculated on the basis of the urethane forming components which establishes the limit of about 15 lbs. per ft³.

Although the use of a blowing agent is not essential to the preparation of the polyurethane foams of the present invention, in some instances it may be desired to employ minor amounts, about 1 to about 20 parts by weight per hundred parts of the active hydrogen containing component of a blowing agent such as a volatile organic liquid having a boiling point below about 110°C such as for example, halohydrocarbons such as methylene chloride, monofluorotrichloromethane and the like or from about 0.1 to about 5 parts by weight of water per hundred parts of the active hydrogen-containing component. The volatile hydrocarbon blowing agents are more fully described in U.S. Pat. No. 3,072,582.

Suitable substrates to which the frothed compositions of the present invention are applied include carpet, particularly tufted carpet, paper, synthetic and natural textile fabrics such as, for example, nylon, polyester, acrylic, cotton, wool, and the like.

The frothed compositions of the present invention can be cured at ordinary room temperatures or the cure can be accomplished at elevated temperatures.

The following examples are illustrative of the present invention but are not to be construed as to limiting the scope thereof in any manner.

EXAMPLES 1-8 AND COMPARATIVE EXPERIMENTS I-III

In the following examples and experiments, the polyether polyol or a mixture of such with a polyhydroxyl containing compound and the isocyanate-containing prepolymer were placed into a Hobart mixer equipped with a blade for whipping air into said mixture and whipped at high speed for a time sufficient to provide a froth, usually about 2 minutes. After the whipping was completed, the catalyst, a 33% solution of triethylenediamine in dipropylene glycol was added and the resultant froth mixed for an additional 45.0 seconds and then poured into an open container to cure.

The quantities and type of polyols and polyisocyanates employed and the properties of the foam are given in the following table.

|  | Example 1 | Example 2 | Comparative Experiment I | Example 3 | Example 4 | Example 5 |
|---|---|---|---|---|---|---|
| Component (1a) |  |  |  |  |  |  |
| Type | $A^1$ | $D^4$ | $E^5$ | $F^6$ | $G^7$ | $H^8$ |
| Grams | 270 | 270 | 270 | 270 | 270 | 270 |
| Component (1b) |  |  |  |  |  |  |
| Type | $B^2$ | B | B | B | B | B |
| Grams | 30 | 30 | 30 | 30 | 30 | 30 |
| Component (2) |  |  |  |  |  |  |
| Type | $C^3$ | C | C | C | C | $I^9$ |
| Grams | 142.5 | 117 | 138 | 125.6 | 121 | 137.5 |
| Triethylene Diamine, mls. of solution | 3 | 3 | 3 | 3 | 3 | 3 |
| Silicone Cell Control Agent, DC 190* | 0 | 0 | 0 | 0 | 0 | 0 |
| Density, lbs/ft³ | 12.3 | 13.8 | foam collapsed | 12.2 | 14.8 | 11.0 |

*Available from Dow Corning Corp.

|  | Example 6 | Comparative Experiment II | Example 7 | Comparative Experiment III | Example 8 |
|---|---|---|---|---|---|
| Component (1a) |  |  |  |  |  |
| Type | H | H | H | H | H |
| Grams | 270 | 270 | 90 | 90 | 90 |
| Component (1b) |  |  |  |  |  |
| Type | B | B | B | B | B |
| Grams | 30 | 30 | 10 | 10 | 10 |
| Component (2) |  |  |  |  |  |
| Type | $J^{10}$ | $K^{11}$ | J | J | $L^{12}$ |
| Grams | 112 | 61.4 | 41.2 | 41.2 | 41.2 |
| Triethylene Diamine, mls. of solution | 3 | 3 | 1.0 | 1.0 | 1.0 |
| Silicone Cell Control Agent, DC 190* | 0 | 0 | 0 | 0.5 | 0 |
| Density, lbs/ft³ | 11.3 | 30 | 12.5 | foam pruned | 12.3 |

*Available from Dow Corning Corp.

|  | Example 9 | Comparative Experiment IV | Example 10 | Comparative Experiment V |
|---|---|---|---|---|
| Component (1a) |  |  |  |  |
| Type | H | H | H | H |
| Grams | 360 | 360 | 360 | 360 |

|  | Example 9 | Comparative Experiment IV | Example 10 | Comparative Experiment V |
|---|---|---|---|---|
| Component (1b) | | | | |
| Type | B | B | B | B |
| Grams | 40 | 40 | 40 | 40 |
| Component (2) | | | | |
| Type | M[13] | M | N[14] | N |
| Grams | 164 | 164 | 130 | 130 |
| Triethylene Diamine, mls. of solution | 1.5 | 1.5 | 1.5 | 1.5 |
| Silicone Cell Control Agent, | | | | |
| DC-190[a] | 0 | 0 | 0 | 0 |
| GE-1066[b] | 0 | 2.0 | 0 | 2.0 |
| Density, lbs/ft³ | 8.95 | 12.0[c] | 10.3 | Pruned[d] |

[a]DC-190 is available from Dow Corning Corp.
[b]GE-1066 is available from General Electric.
[c]1 in. × 2 in. × 2 in. samples were cut and tested immediately after cutting. However, 5 minutes after cutting, the samples drew in on all four sides and top and bottom in a concave manner. This foam is not acceptable for commercial use.
[d]Foam pruned i.e. shrank concavely on the sides and sank inwardly down from the top to such an extent that samples could not be obtained. This foam is not commercially acceptable.

|  | Example 11 | Example 12 | Example 13 | Comparative Experiment VI |
|---|---|---|---|---|
| Component (1a) | | | | |
| Type | P[15] | Q[16] | H | H |
| Grams | 364 | 364 | 360 | 360 |
| Component (1b) | | | | |
| Type | B | B | B | B |
| Grams | 36 | 36 | 40 | 40 |
| Component (2) | | | | |
| Type | C | C | R[17] | R |
| Grams | 165 | 165 | 155 | 155 |
| Triethylene Diamine, mls. of solution | 0 | 0 | 1.0 | 1.0 |
| Stannous Octoate, grams | 0.75 | 0.75 | 0 | 0 |
| Silicone Cell Control Agent, DC 190[a] | 0 | 0 | 0 | 0.5 |
| Density, lbs/ft³ | 10.1[b] | 9.7[b] | 8.4 | 14.6[c] |

[a]DC-190 is a silicone oil cell control agent commercially available from Dow Corning Corp.
[b]These foams, after 24 hours shrank slightly but were still a commercially useful foam.
[c]This foam shrank before and after cutting. Utility as a commercially acceptable foam is doubtful.

Footnotes to Table

[1] Polyetherpolyol A was the reaction product of glycerine with propylene oxide and end-capped with ethylene oxide to the extent 2 moles of ethylene oxide per OH group and having an OH equivalent weight of about 1000.

[2] Glycol B was diethylene glycol.

[3] Prepolymer C was the reaction product of an excess of toluene diisocyanate with the reaction product of glycerine with propylene oxide in a molar ratio of 3 moles of propylene oxide per mole of glycerine, said prepolymer having 30% by weight free NCO groups.

[4] Polyether Polyol D was the reaction product of glycerine with propylene oxide end-capped with 2 moles of ethylene oxide per OH group and having an OH equivalent weight of about 2150.

[5] Polyether Polyol E was the reaction product of glycerine with propylene oxide and having an OH equivalent weight of about 1000.

[6] Polyether Polyol F was the reaction product of glycerine with a mixture of 84 percent by weight of propylene oxide and 16 percent by weight of ethylene oxide end-capped with an additional 4 moles of ethylene oxide per OH group and having an OH equivalent weight of about 1540.

[7] Polyether Polyol G was the reaction product of glycerine with propylene oxide end-capped with 5.5 moles of ethylene oxide per OH and having an OH equivalent weight of about 1825.

[8] Polyether Polyol H was the reaction product of glycerine with propylene oxide end capped with about 4.5 moles of ethylene oxide per OH group and having an OH equivalent weight of about 1600.

[9] Prepolymer I was the reaction product of polyoxypropylene glycol having an average molecular weight of about 1000 with an excess of toluene diisocyanate and having a % by weight free NCO of about 26.5.

[10] Prepolymer J was the reaction product of an excess of toluene diisocyanate with the reaction product of glycerine and propylene oxide to an equivalent weight of about 230 and having a % by weight of free NCO of about 32.5.

[11] Isocyanate K was toluenediisocyanate, an 80/20 mixture of 2,4-/2,6-isomers.

[12] Prepolymer L was the reaction product of an excess of toluenediisocyanate with the reaction product of a mixture of sucrose and glycerine in a molar ratio of 1:3, respectively, with propylene oxide to an OH equivalent weight of 114, the resultant prepolymer had 30% free NCO groups.

[13] Isocyanate M was a polymethylene polyphenylisocyanate having an average functionality of about 2.6-2.8 and an NCO equivalent weight of about 134.

[14] Isocyanate N was a crude toluene diisocyanate having an NCO equivalent weight of about 109 and an average NCO functionality of about 2.3-2.7.

[15] Polyol P was the reaction product of glycerine with about 11.6 moles of propylene oxide per hydroxyl group followed by about 4.38 moles of ethylene oxide per hydroxyl group and finally 5.5 moles of propylene oxide per OH group contained in glycerine. The resultant polyol had an average molecular weight of about 3699.

[16] Polyol Q was the reaction product of glycerine with about 2 moles of propylene oxide per hydroxyl group followed by 4.9 moles of ethylene oxide per hydroxyl group and finally 15 moles of propylene oxide per hydroxyl group contained in glycerine. The resultant product had an average molecular weight of about 3669.

[17] Isocyanate R was a blend of 50% by weight of a polymethylene polyphenylisocyanate having an average functionality of about 2.6 and an equivalent weight of about 134 and 50% by weight of an 80/20 mixture of 2,4-/2,6-toluenediisocyanate. The resultant blend had an NCO equivalent weight of about 105 and an average functionality of about 2.35.

It is readily apparent from the foregoing examples that the compositions of the present invention do not require the use of a silicone oil cell control agent and in some instances the use of such a silicone oil is actually detrimental to the foam rendering it unsuitable for use in preparing commercially acceptable polyurethane foams.

We claim:

1. A flexible polyurethane foam having a density of less than about 15 lbs./ft.$^3$, calculated on the basis of the urethane forming components, resulting from curing a composition which has been frothed by mechanically inducing into such composition a substance which is in the gaseous state at standard temperature and pressure, said composition being void of a silicone oil cell control agent and which comprises:
   1. an active hydrogen containing composition containing
      a. from about 50 to about 100 parts by weight of a polyether polyol having a hydroxyl functionality of from 2 to 3 and containing an internal block of at least 3 moles of ethylene oxide per active hydrogen atom or an end-cap of at least 2 moles of ethylene oxide per active hydrogen atom or combination thereof and having an OH equivalent weight of from about 1,000 to about 2,500 and
      b. from about 0 to about 50 parts by weight of an aromatic amine or a glycol;
   2. a polyisocyanate-containing material selected from the group consisting of
      a. an isocyanate terminated prepolymer resulting from the reaction of an organic diisocyanate with a compound having from 2 to 4 hydroxyl groups per molecule and an OH equivalent weight of from about 53 to about 1,000,
      b. polymeric polyisocyanates,
      c. crude aromatic diisocyanates and
      d. mixtures thereof, and
   3. a catalyst for urethane formation, wherein (1) and (2) are employed in quantities so as to provide an NCO:OH ratio of from about 0.85:1 to about 2.0:1.

2. The composition of claim 1 wherein component (1) contains from about 80 to about 95 parts by weight of (a) and from about 5 to about 20 parts by weight of (b) and wherein components (1) and (2) are present in quantities so as to provide an NCO:OH ratio of from about 1.0:1 to about 1.2:1.

3. The foam of claim 2 wherein component (1a) is the reaction product of glycerine with propylene oxide subsequently endcapped with 2–6 moles of ethylene oxide per hydroxyl group and having an OH equivalent weight of about 1,500 to about 1,800; component (1b) is diethylene glycol and component (2) a prepolymer resulting from the reaction of an excess of toluene diisocyanate with a polyether polyol that is the reaction product of glycerine with propylene oxide in a mole ratio of about 3 moles of propylene oxide per mole of glycerine, and having about 30 percent by weight free NCO groups.

4. A process for preparing the flexible polyurethane foams of claim 1 which comprises mechanically inducing a substance which is in the gaseous state at standard temperature and pressure, in the absence of a cell control agent, into a mixture comprising the composition of claim 1, thereby producing a froth which is dispensed into a suitable container or onto a suitable substrate wherein or whereupon the froth is cured.

5. The process of claim 4 wherein said froth is dispensed onto a suitable substrate.

6. The process of claim 4 wherein the NCO:OH ratio is from about 1.0:1 to about 1.2:1.

7. A process for preparing the polyurethane foams of claim 1 wherein a froth is prepared by mechanically inducing a substance which is in its gaseous state at standard conditions of temperature and pressure into a mixture of all the components comprising the foam composition of claim 1 except the catalyst for urethane formation and thereafter mixing the resultant froth with said catalyst in a suitable mixer, dispensing the resultant froth-catalyst mixture into a suitable container or onto a suitable substrate and curing said froth-catalyst mixture.

* * * * *